United States Patent Office 3,822,266
Patented July 2, 1974

---

3,822,266
[3-(1-PIPERAZINYL)-2-HYDROXY-PROPOXY]
ACETANILIDES
Albrecht Edenhofer, Riehen, and Hans Spiegelberg, Basel,
Switzerland, assignors to Hoffmann-La Roche Inc.,
Nutley, N.J.
No Drawing. Original application Dec. 4, 1969, Ser. No.
882,297, now Patent No. 3,701,777, dated Oct. 31,
1972. Divided and this application July 7, 1972, Ser.
No. 269,658
Claims priority, application Switzerland, Dec. 24, 1968,
19,269/68
Int. Cl. C07d 51/70
U.S. Cl. 260—268 R                                2 Claims

ABSTRACT OF THE DISCLOSURE

Substituted [3-(4-phenyl-1-piperazinyl)-propoxy or propylthio]anilines prepared, inter alia, by the reaction of the correspondingly substituted propoxy or propyl-thio anilines and N-phenyl-piperazines, are described. The end products, i.e., the substituted [3,(4-phenyl-1-piperazinyl)-propoxy or propyl-thio] anilines are useful as hypotensive agents. The [3-(1-piperazinyl)-2-hydroxy-propoxy]acetanilides are specifically claimed.

---

This is a division of application Ser. No. 882,297, filed Dec. 4, 1969, now U.S. Pat. 3,701,777, issued Oct. 31, 1972.

Brief Summary of the Invention

The invention relates to aromatic ethers of the formula

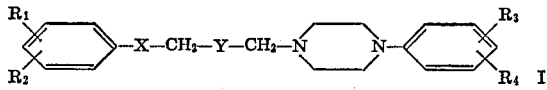

wherein $R_1$ is amino, mono-(lower alkyl)amino, lower alkanoylamido, N-(lower alkyl) lower alkanoylamido, lower alkylsulfonylamido; $R_2$ is hydrogen or halogen; $R_3$ and $R_4$, individually, are hydrogen, hydroxy, amino, halogen, lower alkyl or lower alkoxy; X is oxy or thio; and Y is methylene, hydroxymethylene, lower alkanoyloxymethylene, lower alkyl-sulfonyloxymethylene, arylsulfonyloxymethylene or carbonyl, and their pharmaceutically acceptable acid addition salts.

In another aspect, the invention relates to novel intermediates, for example, the compounds of formulas

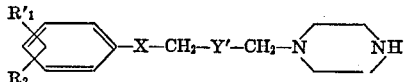

VI

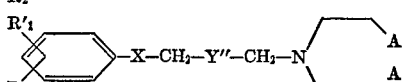

VIII

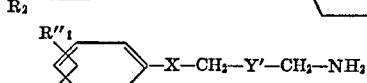

Xa

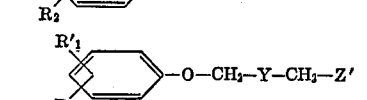

IIb

IIc

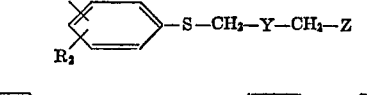

XII

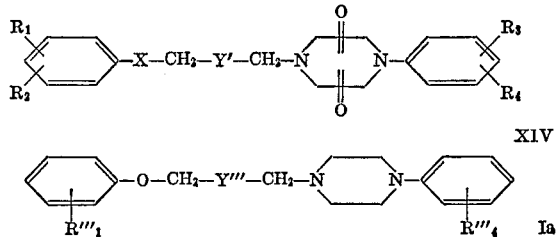

XIV

Ia wherein the various substituents are as hereinafter described, except that $Z'$ is halogen, lower alkylsulfonyloxy or arylsulfonyloxy, $R''$ is lower alkanoylamido or N-(lower alkyl) lower alkanoylamido, $R'''_1$ and $R'''_4$ are nitro, or $R'''_1$ is nitro and $R'''_4$ is lower alkoxy, or $R'''_4$ is nitro and $R'''_1$ is lower alkanoylamido and $Y'''$ is methylene or hydroxymethylene.

Detailed Description of the Invention

The invention relates to aromatic ethers of the formula

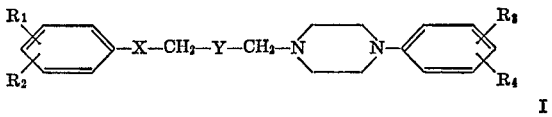

I wherein $R_1$ is amino, mono-(lower alkyl)amino, lower alkanoylamido, N-(lower alkyl) lower alkanoylamido, lower alkylsulfonylamido; $R_2$ is hydrogen or halogen; $R_3$ and $R_4$, individually, are hydrogen, hydroxy, amino, halogen, lower alkyl or lower alkoxy; X is oxy or thio; and Y is methylene, hydroxymethylene, lower alkanoyloxymethylene, lower alkylsulfonyloxymethylene, arylsulfonyloxymethylene or carbonyl and their pharmaceutically acceptable acid addition salts.

As used herein, the term "lower alkyl" denotes straight or branched chain lower alkyl of 1 to 6 carbon atoms, for example, methyl, ethyl or isopropyl, butyl, pentyl and the like. The term "lower alkoxy" denotes lower alkyl ether groups in which the lower alkyl is as described above, for example, methoxy, ethoxy, isopropoxy and the like. The term "halogen" denotes chlorine, bromine, fluorine and iodine. Of the halogens, fluorine and chlorine are preferred.

The amino group, if desired, can be substituted by lower alkyl of 1 to 6 carbon atoms, such as for example, methyl, ethyl, propyl-, butyl- or pentyl-amino and the like. The term "lower alkanoyl" denotes a residue of 1 to 6 carbon atoms which is derived from a residue of a carboxylic acid of 1 to 6 carbon atoms, for example, formyl, acetyl, propionyl or the like; acetyl is preferred. The lower alkylsulfonyl residues are derived from sulfuric acid substituted by lower alkyl, for example, methylsulfonyl, ethylsulfonyl and the like; methylsulfonyl is preferred. The term "aryl" denotes phenyl or phenyl bearing a lower alkyl of 1–4 carbon atoms. Of these, p-tolyl is preferred.

Representative examples of the compounds of formula I of the invention are:

rac.-o-{3-[4-(o-methoxy-phenyl)-1-piperazinyl]-2-hydroxy-propoxy}-aniline;
rac.-o-{3-[4-(o-methoxy-phenyl)-1-piperazinyl]-2-hydroxy-propoxy}-methylaniline;
rac.-o-{3-[4-(o-amino-phenyl)-1-piperazinyl]-2-hydroxy-propoxy}-aniline;
rac.-2'-[3-(4-phenyl-1-piperazinyl)-2-hydroxy-propoxy]-acetanilide;
rac.-2'-[3-(4-phenyl-1-piperazinyl)-2-hydroxy-propoxy]-propionanilide;
rac.-2'-{3-[4-(p-chloro-phenyl)-1-piperazinyl]-2-hydroxy-propoxy}-acetanilide;
rac.-2'-[3-(4-o-tolyl-1-piperazinyl)-2-hydroxy-propoxy]-acetanilide;

rac.-2'-{3-[4-(o-methoxy-phenyl)-1-piperazinyl]-2-hydroxy-propoxy}-acetanilide;
rac.-2'-{3-[4-(2,4-dimethoxy-phenyl)-1-piperazinyl]-2-hydroxy-propoxy}-acetanilide;
rac.-2'-{3-[4-(o-ethoxy-phenyl)-1-piperazinyl]-2-hydroxy-propoxy}-propionanilide;
rac.-2'-{3-[4-(o-acetamido-phenyl)-1-piperazinyl]-2-hydroxy-propoxy}-acetanilide;
rac.-2'-{3-[4-(o-methoxy-phenyl)-1-piperazinyl]-2-hydroxy-propoxy}-N-methyl-acetanilide;
rac.-2'-{3-[4-(o-methoxy-phenyl)-1-piperazinyl]-2-hydroxy-propoxy}-methane-sulfonanilide;
rac.-2'-{3-[4-(o-methoxy-phenyl)-1-piperazinyl-2-acetoxy-propoxy}-acetanilide;
2'-{3-[4-(o-methoxy-phenyl)-1-piperazinyl]-propoxy}-acetanilide;
4'-[{3-[4-(o-methoxy-phenyl)-1-piperazinyl]-propyl}-thio]-acetanilide;
rac.-4'-[{3-[4-(o-methoxy-phenyl)-1-piperazinyl]-2-hydroxy-propyl}-thio]-acetanilide;
(+) o-{3-[4-(o-methoxy-phenyl)-1-piperazinyl]-2-hydroxy-propoxy}-aniline;
(+) 2'-{3-[4-(o-methoxy-phenyl)-1-piperazinyl]-2-hydroxy-propoxy}-acetanilide; and the like.

Compounds of the invention can be prepared according to the following process variants:

(a) A compound of the formula

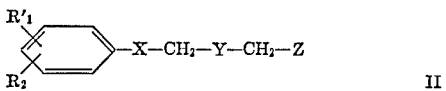
II wherein $R'_1$ is nitro, lower alkanoylamido, N-(lower alkyl) lower alkanoylamido; $R_2$ is hydrogen or halogen; X is oxy or thio; Y is methylene, hydroxymethylene, lower alkanoyloxymethylene, lower alkyl-sulfonyloxymethylene, arylsulfonyloxymethylene or carbonyl; Z is halogen, aryl or lower alkyl sulfonyloxy or when taken together with Y and the end methylene group is

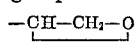

is reacted with a compound of the formula

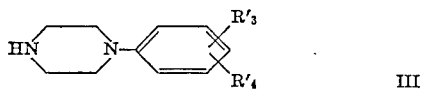
III wherein $R'_3$ and $R'_4$, individually, are hydrogen, hydroxy, nitro, halogen, lower alkyl or lower alkoxy;

(b) A compound of the formula

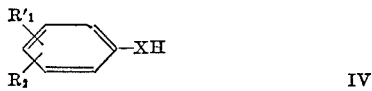
IV wherein $R'_1$, $R_2$ and X are as previously described, is reacted with a compound of the formula

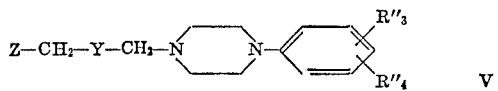
V wherein Y and Z are as previously described; and $R''_3$ and $R''_4$, individually, are hydrogen, nitro, halogen, lower alkyl or lower alkoxy;

(c) A compound of the formula

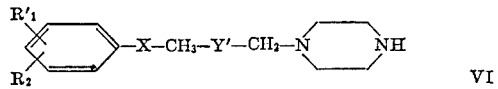
VI wherein $R'_1$, $R_2$ and X are as previously described; and Y' is methylene, hydroxymethylene or carbonyl, is reacted with a compound of the formula

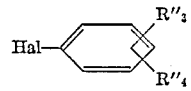
VII wherein $R''_3$ and $R''_4$ are as previously described; and Hal is halogen;

(d) A compound of the formula

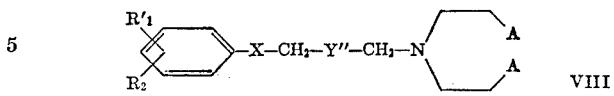
VIII wherein $R'_1$, $R_2$ and X are as previously described; Y'' is methylene or carbonyl and A is halogen, lower alkylsulfonyloxy or arylsulfonyloxy, is reacted with a compound of the formula

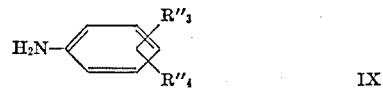
IX wherein $R''_3$ and $R''_4$ are as previously described;

(e) A compound of the formula

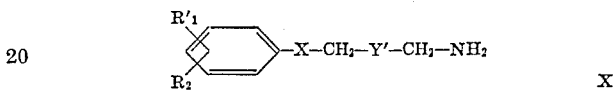
X wherein $R'_1$, $R_2$, X and Y' are as previously described, is reacted with a compound of the formula

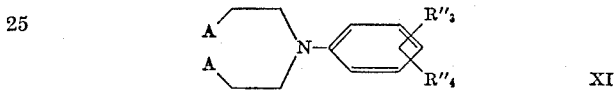
XI wherein $R''_3$, $R''_4$ and A are as previously described;

(f) A compound of the formula

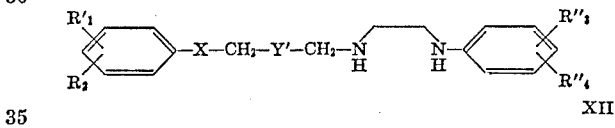
XII wherein $R'_1$, $R_2$, $R''_3$, $R''_4$, X and Y' are as previously described, is reacted with a compound of the formula $$A-CH_2-CH_2-A$$
XIII wherein A is as previously described; or (g) The amide groups in a compound of the formula

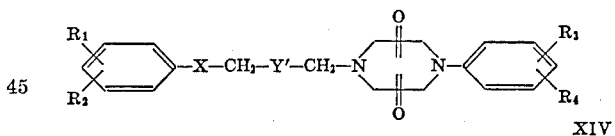
XIV wherein $R_1$, $R_2$, $R_3$, $R_4$, X and Y' are as previously described, are deoxygenated. The product obtained in a given case above can be further modified. For example, a nitro group is reduced, an acylamido group is saponified, if desired, an amino group or a monoalkylamino group is acylated or an amino group is alkylated, if desired, a carbonyl is reduced to the hydroxymethylene, if desired, a hydroxymethylene is esterified, if desired, and the compound of formula I obtained is optionally converted into a pharmaceutically acceptable acid addition salt.

Of the starting compounds of formula II, 2'-[2,3-epoxypropoxy]-acetanilide is a known compound. On the other hand, the corresponding 2'-[2-hydroxy-3-halo(or tosyloxy)-propoxy]-acetanilide is a new compound which can, for example, be prepared by treating the epoxide mentioned hereinbefore in a protic solvent, for example, a lower alkanol such as methanol with an acid addition salt of a tertiary base, for example, pyridine hydrochloride or triethylamine hydrochloride and, preferably at a temperature in the range of between about room temperature and the boiling point of the reaction mixture. The other compounds of formula II can be prepared in an analogous manner.

The compounds of formula III, for example 1-[o-methoxy-phenyl]-piperazine, are known compounds or can be prepared in accordance with known procedures.

The reaction of the compounds of formula II with those of formula III when the compound of formula II is the corresponding epoxide, is advantageously carried out in a polar organic solvent, for example, a lower alkanol such as methanol, or a cyclic ether such as dioxane at a temperature in the range of between about room temperature and the boiling temperature of the reaction mixture. The corresponding halo or tosyloxy compound of formula II is reacted in the presence of an acid-binding agent, for example, potassium or sodium carbonate, in a lower alkanol such as ethanol or isopropanol, or in dimethylformamide or tetrahydrofuran, at a temperature in the range of between about room temperature and the boiling temperature of the reaction mixture.

The starting compounds of formula IV, for example, o-acetamido-phenol, are known compounds or can be prepared in accordance with known procedures.

On the other hand, the reaction components of formula V are known compounds. The corresponding tosyloxy compound can be prepared by reaction of the epoxide obtained with p-toluenesulfonic acid.

The reaction of compounds of formula IV with the halo or tosyloxy compounds of formula V is advantageously carried out by converting the compound of formula IV into the alkali salt with an alkali metal alkanolate and allowed to react with the compound of formula V at a temperature in the range of between about room temperature and the boiling temperature of the reaction mixture.

If the epoxide of a compound of formula V is utilized, the reaction with a compound of formula IV is preferably carried out in the presence of a catalytic amount of an organic or inorganic base, such as pyridine or potassium hydroxide, in a polar solvent, preferably a lower alkanol such as ethanol, or a cyclic ether such as dioxane, conveniently at a temperature in the range of between about room temperature and the boiling temperature of the reaction mixture.

The compounds of formula VI are new compounds. 4'-[3-(1-piperazinyl) - 2 - hydroxy-propoxy]-acetanilide, for example, can be prepared by reacting 4'-[2,3-epoxy-propoxy]-acetanilide with 1-benzyl-piperazine in an organic solvent, for example, an alkanol such as ethanol, or a cyclic ether such as dioxane, at an elevated temperature, preferably at the boiling temperature of the reaction mixture and the benzyl residue is hydrogenolytically split off. The other compounds of formula VI can be prepared in an analogous manner.

The compounds of formula VII are known compounds or can be prepared in accordane with known procedures.

The reaction of the compounds of formula VI with the compounds of formula VII is carried out utilizing a polar organic solvent, preferably at a temperature in the range of between about 100 and 200° C.

The componds of formula VIII are new compounds. 4'-{3-[bis-(2-bromo[or bis - 2 - tosyloxy]-ethyl)-amino]-propoxy}-acetanilide, for example, can be prepared by reacting 4'-[3-bromopropoxy]-acetanilide with diethanolamine in the presence of an acid-binding agent, for example, potassium or sodium carbonate, and a polar solvent, preferably a lower alkanol such as ethanol or isopropanol, at an elevated temperature, conveniently at the boiling temperature of the reaction mixture. The resulting di-ethanolamine compound can be halogenated utilizing a halogenating agent, for example, phosphorus tribromide, phosphorus pentachloride or thionyl chloride, or tosylated by treatment with p-toluenesulfonyl chloride in the presence of a base such as pyridine. The other compounds of formula VIII can be prepared in an analogous manner.

The compounds of formula IX are known compounds or can be prepared in accordance with known procedures.

The reaction of compounds of formula VIII with compounds of formula IX is preferably carried out in the presence of an acid-binding agent, preferably sodium or potassium carbonate, and a polar solvent such as ethanol, isopropanol or n-butanol, at an elevated temperature, conveniently at the boiling temperature of the reaction mixture.

The compounds of formula X, except the nitro derivatives, are new compounds. 2'-[3-amino-2-hydroxy-propoxy]-acetanilide, for example, can be prepared by reacting a solution of ammonia in a lower alkanol, for example ammonia in methanol, with 2'-[2,3-epoxy-propoxy]-acetanilide at a temperature in the range of between about 0° and room temperature. The mixture of primary and secondary amine obtained is separated by fractional crystallization or by chromatography. The other compounds of formula X can be prepared in an analogous manner.

The reactants of formula XI are known compounds or can be prepared in accordance with known procedures.

The reaction of compounds of formula X with compounds of formula XI is preferably carried out in the presence of an acid-binding agent, for example, sodium or potassium carbonate, and a polar solvent, such as ethanol, isopropanol or n-butanol, at an elevated temperature, conveniently at the boiling temperature of the reaction mixture.

Starting compounds of formula XII are new compounds. 2' - {3 - [2-(o-methoxy-anilino)-ethylamino]-2-hydroxy-propoxy}-acetanilide, for example, can be prepared by reacting 2'-[2,3 - epoxy-propoxy]-acetanilide with an excess of ethyleneimine at a temperature in the range of between about 0° and room temperature. The 2'-[3-aziridino - 2 - hydroxy-propoxy]-acetanilide obtained is reacted with O-anisidine in the presence of an acid, preferably maleic acid, at a temperature in the range of between about 0° and room temperature. The other compounds of formula XII can be prepared in an analogous manner.

The compounds of formula XIII are known compounds or can be prepared in accordance with known procedures.

The compounds of formula XII are preferably cyclized with a 1,2-dihalo[or ditosyloxy]-ethane of formula XIII at an elevated temperature, conveniently at the boiling temperature of the reaction mixture.

The starting compounds of formula XIV are new compounds and can be prepared as hereinafter described. 2'-[3-(4-phenyl - 1 - (2,6-diketopiperazinyl)-2-hydroxy-propoxy]-acetanilide, for example, can be prepared by reacting 2'-[2,3 - epoxy-propoxy]-acetanilide with 4-phenyl-2,6-diketo-piperazine in the presence of catalytic amounts of a base, for example, pyridine and a polar solvent, preferably a lower alkanol, such as ethanol, or a cyclic ether such as dioxane, at an elevated temperature, conveniently at boiling temperature of the reaction mixture. The other compounds of formula XIV can be prepared in an analogous manner.

The deoxygenation of the amide groups present in compounds of formula XIV is conveniently carried out by reducing the compound of formula XIV with a complex metal hydride, for example, with lithium aluminum hydride in an aprotic solvent, such as ethyl ether or tetrahydrofuran, at an elevated temperature, conveniently at the boiling temperature of the reaction mixture. Under the conditions mentioned, the carbonyl group Y' is transformed into a hydroxymethylene group Y.

Compounds obtained which contain a nitro group are expediently reduced by chemical or catalytic means known to the art, for example, with tin/hydrochloric acid or hydrogen in the presence of a noble metal catalyst. The hydrogenation is preferably carried out under normal pressure and room temperature, in an alkanol, preferably ethanol, weakly acidified, for example, with hydrochloric acid, in the presence of palladium/charcoal as catalyst.

The compounds of formula I obtained in which $R_1$ is alkanoyl-amido can be saponified in a known manner with acidic or alkaline agents, for example, with dilute aqueous alkali or aqueous acid. The saponification is advantageously carried out with a 20 percent aqueous hydrochloric acid at an elevated temperature, conveniently at the boiling temperature of the reaction mixture.

The compounds of formula I obtained in which $R_1$ is amino can be acylated in a known manner, for example, by treatment with an acid halide or acid anhydride. When employing alkanoyl or alkylsulfonyl halides and alkanoyl anhydrides, the acylation is conveniently carried out in the presence of a base, for example, pyridine or triethylamine, in the cold, preferably at a temperature in the range of about 0° to about 5° C. When employing alkanoyl anhydrides, the reaction may also be conducted in the presence of a protic solvent, for example, a lower alkanol such as methanol or ethanol, preferably at room temperature, and in the presence of dilute acetic acid.

The compounds of formula I obtained in which $R_1$ is amino or acylamido can be alkylated in a known manner, for example, with alkyl halides. The reaction is conveniently effected at an elevated temperature, preferably at the boiling point of the reaction mixture. The compounds of formula I, in which $R_1$ is amino, can be methylated with the aid of formaldehyde/formic acid. In so doing, the amine is dissolved in 90 percent formic acid and treated with 40 percent formaldehyde. Upon the cessation of the evolution of carbon dioxide, the reaction mixture is further heated on the steam bath before being worked up.

The compounds of formula I obtained in which Y is carbonyl can be reduced to compounds of formula I in which Y is hydroxymethylene in a known manner, for example, by treatment with a complex metal hydride, preferably a complex borohydride. The reduction is conveniently carried out with the aid of an alkali metal borohydride, for example sodium borohydride, in a lower alkanol such as ethanol or the like at a temperature in the range of between about room temperature and the boiling point of the reaction mixture.

The compounds of formula I in which Y is hydroxymethylene can be acylated in a known manner, for example, by reaction with a lower alkanoyl, lower alkylsulfonyl or arylsulfonyl halide or anhydride, preferably in the presence of a base, for example, pyridine or triethylamine, at a temperature in the range of between about room temperature and the boiling point of the reaction mixture. An amino group that may be present will likewise be acylated under these conditions.

The compounds of formula I wherein Y is hydroxymethylene are obtained as racemates. These, as well as the corresponding nitro-substituted compounds, can be separated into their optical antipodes in a known manner, for example, with the aid of optically active acids such as tartaric acid.

The compounds of formula I form addition salts with inorganic or organic acids. Exemplary of these are: salts with hydrohalic acids such as hydrochloric or hydrobromic acid, salts with mineral acids, for example, with sulfuric acid, or also salts with organic acids, for example, with benzoic acid, acetic acid, tartaric acid, citric acid, lactic acid or the like.

The aromatic ethers of formula I prepared in accordance with the invention are hypotensively active, and are therefore useful as hypotensive agents. Compounds of formula I wherein $R_1$ is acylamido, $R_2$ and $R_3$ are hydrogen, $R_4$ is hydrogen or lower alkoxy, X is oxy and Y is hydroxymethylene are preferred compounds. (+)-2'-{3-[4-(o-methoxy-phenyl)-1-piperazinyl]-2-hydroxy-propoxy}-acetanilide has been found to exhibit a potent hypotensive activity. The toxicity of this compound is very low. In mice and rats, the lethal dose [LD$_{50}$] on oral administration is about 300 mg./kg. The blood pressure-lowering action in mice has been demonstrated at a dosage of 0.3 mg. p.o./kg.

Thus, the aromatic ethers of formula I can be used as hypotensively active agents for controlling pathological high blood pressure, especially for controlling essential hypertonia. For such uses, up to about 200 mg./day of the compounds of formula I, as exemplified by (+)-2'-{3-[4-(o-methoxy-phenyl)-1-piperazinyl]-2-hydroxy-propoxy} acetanilide can be administered daily in divided doses.

The compounds of formula I can be used in the form of pharmaceutical preparations which contain them or their salts in admixture with an organic or inorganic pharmaceutically inert carrier suitable for enteral or parenteral application such as, for example, water, gelatin, gum arabic, lactose, starches, vegetable oils, polyalkyleneglycols, and the like. The pharmaceutical preparations can be in solid form, for example, tablets, dragees, suppositories or capsules, or in liquid form, for example, as solutions, suspensions or emulsions. The preparation may be sterilized and/or contain additives, such as preservatives, stabilizers, wetting or emulsifying agents, or salts for varying the osmotic pressure. The pharmaceutical preparations can also contain additional therapeutically active substances.

EXAMPLE 8

Preparation of rac.-4'-{3-[4-(o-aminophenyl)-1-piperazinyl]-2-hydroxy-propoxy}-acetanilide hydrochloride 0.73 g. of rac.-4'-[3-(1-piperazinyl)-2-hydroxy-propoxy]acetanilide hydrochloride, 0.34 g. of potassium hydroxide and 0.32 g. of o-chloronitrobenzene in 20 ml. of n-butanol are reacted under reflux conditions for 12 hours. The resulting reaction mixture is evaporated under reduced pressure, and the residue is taken up in chloroform. The solution is washed with water and evaporated to dryness. The residual rac.-4'-{3-[4-(o-nitrophenyl)-1-piperazinyl]-2-hydroxy-propoxy}-acetanilide is purified by adsorption on silica gel [elution mixture: methanol]. The hydrochloride salt melts at 243° C.

0.45 g. of the foregoing compound is dissolved in 200 ml. of ethanol (95 percent) with mild heating and hydrogenated in the presence of 50 mg. of platinum oxide at room temperature. The hydrogenation is carried out until the theoretical uptake of hydrogen is completed. The catalyst is removed by filtration. The filtrate is brought to a congo-acidic reaction with ethanolic hydrochloric acid and evaporated to dryness under reduced pressure. The residual rac.-4'-{3-[4-(o-aminophenyl)-1-piperazinyl]2-hydroxy-propoxy}-acetanilide hydrochloride, after recrystallization from ethanol/ethyl acetate, has a melting point of 232–234° C.

EXAMPLE 11

Preparation of rac. 4'-{3-[4-(o-methoxyphenyl)-1-piperazinyl]-2-hydroxy-propoxy}-butyranilide 0.2 g. of rac. 4'-{3-[2-(o-anisidino-ethyl)-amino]-2-hydroxy-propoxy}-butyranilide and 0.1 g. of 1,2-dibromoethane are heated on a water bath for 12 hours. After cooling, the reaction mixture is extracted with ether. The ethereal extract is filtered and evaporated under reduced pressure, and the residue is dissolved in sodium hydroxide and chloroform. The chloroform phase is evaporated. The residual rac. 4'-{3-[4-(o-methoxyphenyl)-1-piperazinyl]-2-hydroxy-propoxy}-butyranilide is purified by adsorption on silica gel [elution solvent: ethyl acetate]. The resulting base can be converted to the dihydrochloride in the usual manner and has a melting point of 215° C. (from ethanol).

The rac. 4'-{3-[2-(o-anisidino-ethyl)-amino]-2-hydroxypropoxy}-butyranilide employed above can be prepared as follows:

12.0 g. of 4'-(2,3-epoxy-propoxy)-butyranilide are treated with 50 ml. of methanol, 50 ml. of ethylenediamine and a trace of potassium hydroxide. The reaction mixture is allowed to stand at room temperature for 12 hours. The excess ethylenediamine and the solvent are evaporated under reduced pressure. The residual rac. 4'-[3-(1-aziridinyl)-2-hydroxypropoxy]-butyranilide, after two recrystallizations from ethyl acetate, has a melting point of 108–110° C.

5.6 g. of rac. 4'-[3-(1-aziridinyl)-2-hydroxy-propoxy]-butyranilide and 2.5 g. of o-anisidine are dissolved in 25 ml. of methanol and treated with a solution containing 5.6 ml. of maleic acid in 10 ml. of methanol. The reaction mixture is allowed to stand at room temperature for 72 hours. Thereafter, the reaction mixture is evaporated under reduced pressure. The base is liberated by the addition of an excess of 1 N sodium hydroxide solution and is extracted with chloroform. The chloroform extract is evaporated. The residual rac. 4'-{3-[2-(o-anisidino-ethyl)-amino]-2-hydroxy - propoxy}-butyranilide is purified by adsorption on silica gel [elution solvent: methanol]. After recrystallization from ethyl acetate, the product melts at 103–104° C.

EXAMPLE 12

Preparation of rac. 2'-[3-(4-phenyl-1-piperazinyl)-2-hydroxypropoxy]-aniline dihydrochloride 4.06 g. of rac. 2'-[3-(4-phenyl-1-piperazinyl)-2-hydroxypropoxy]-acetanilide hydrochloride are treated with 20 ml. of hydrochloric acid (about 20 percent) and heated under reflux conditions for 2 hours. The resulting solution is evaporated to dryness under reduced pressure. The residual rac. 2'-[3-(4-phenyl - 1 - piperazinyl)-2-hydroxypropoxy]-aniline dihydrochloride melts at 290° C. after recrystallization from ethanol/ether.

In an analogous manner, there is obtained:

By the reaction of rac. 2'-{3-[4-(o-methoxyphenyl)-1-piperazinyl]-2-hydroxy - propoxy}-acetanilide hydrochloride: rac. 2'-{3-[4-(o-methoxyphenyl)-1-piperazinyl]-2-hydroxypropoxy}-aniline trihydrochloride having a melting point of 260–262° C. (from methanol/ethyl acetate);

By the reaction of rac. 2'-{2-hydroxy-3-[4-(o-methoxyphenyl)-1-piperazinyl]-propoxy}-N-methyl-acetanilide: rac. 2'-{3-[4-(o - methoxyphenyl)-1-piperazinyl]-2-hydroxy-propoxy}-methylaniline having a melting point of 198° C. (from methanol).

EXAMPLE 13

Preparation of rac. 2'-{3-[4-(o-methoxyphenyl)-1-piperazinyl]-2-hydroxy-propoxy}-methanesulfonanilide To a solution containing 4.1 g. of rac. o-{3-[4-(o-methoxyphenyl)-1-piperazinyl]-2-hydroxy - propoxy}-aniline in 10 ml. of absolute benzene and 5 ml. of absolute pyridine is added a solution containing 1.5 g. of methanesulfonic acid chloride in 5 ml. of benzene with ice cooling and stirring. The mixture is allowed to stand at room temperature for 12 hours. The reaction mixture which solidifies to a solid mass is treated with water after the addition of 20 ml. of chloroform. The organic phase is separated and evaporated. The residual oily rac. 2'-{3-[4-(o - methoxyphenyl)-1-piperazinyl] - 2 - hydroxy-propoxy}-methanesulfonanilide is converted to the crystalline hydrochloride by the addition of ethanolic hydrochloride acid and ethyl acetate. After recrystallization from alcohol/ethyl acetate/ether, the product has a melting point of 217–218° C.

In an analogous manner there is obtained:

By the reaction of o-{3-[4-(o-methoxyphenyl)-1-piperazinyl]-propoxy}-aniline: 2'-{3-[4-(o-methoxyphenyl)-1-piperazinyl]propoxy} - methanesulfonanilide dihydrochloride having a melting point of 200–201° C. (from ethanol/ethyl acetate).

EXAMPLE 14

Preparation of rac. 2'-{3-[4-(o-acetamido-phenyl)-1-piperazinyl]-2-hydroxy-propoxy}-acetanilide 2.4 g. of rac. o-{2-[4-(o-aminophenyl)-1-piperazinyl]-2-hydroxy-propoxy}-aniline are dissolved in 20 ml. of acetic acid and treated with 1 g. of acetic anhydride. The reaction mixture is allowed to stand at room temperature for 12 hours. The solvent is removed under reduced pressure. The residue is dissolved in ethyl acetate, and the resulting solution is treated with ethanolic hydrochloric acid. The precipitated rac. 2'-{3-[4-(o-acetamido-phenyl)-1-piperazinyl]-2-hydroxy-propoxy}-acetanilide, after recrystallization from ethyl acetate, has a melting point of 78–80° C.

The rac. o-{3-[4-(o-aminophenyl)-1-piperazinyl]-2-hydroxy-propoxy}-aniline employed above can be prepared as follows:

2 g. of 2-(2,3-epoxy-propoxy)-nitrobenzene and 2.1 g. of 1-(o-nitrophenyl)-piperazine in 20 ml. of ethanol (95 percent) are heated under reflux condition for 1.5 hours. The solvent is evaporated under reduced pressure. The residue is dissolved in ethyl acetate and acidified to a congo-acidic reaction with alcoholic hydrochloric acid. The rac. o-{3-[4-(o-nitrophenyl) - 1 - piperazinyl]-2-hydroxy-propoxy}-nitrobenzene hydrochloride, after recrystallization from ethanol/isopropanol, has a melting point of 203–205° C.

1 g. of rac. o-{3-[4-(o-nitrophenyl)-1-piperazinyl]-2-hydroxy-propoxy}-nitrobenzene is dissolved in 50 ml. of ethanol (95 percent) and hydrogenated with 50 mg. of platinum oxide at room temperature under normal pressure. The hydrogenation is stopped upon the theoretical uptake of hydrogen. The catalyst is removed by filtration. The filtrate is weakly acidified with alcoholic hydrochloric acid and evaporated to dryness under reduced pressure. The residual rac. o-{3-[4-(o-aminophenyl)-1-piperazinyl]-2-hydroxy-propoxy}-aniline trihydrochloride, after recrystallization from ethanol/ethyl acetate, has a melting point over 300° C.

In an analogous manner there is obtained:

By the reaction of rac. o-{3-[4-(o-methoxyphenyl)-1-piperazinyl]-2-hydroxy-propoxy}-aniline: rac. 2'-{3-[4-(o-methoxyphenyl) - 1 - piperazinyl] - 2 - hydroxy-propoxy}-acetanilide hydrochloride having a melting point of 180–182° C. (from ethanol/ethyl acetate);

By the reaction of o-{3-[4-(o-methoxyphenyl)-1-piperazinyl]-propoxy}-aniline: 2'-{3-[4-(o-methoxyphenyl)-1 - piperazinyl] - propoxy}-acetanilide dihydrochloride having a melting point of 218–222° C. (from ethanol/ethyl acetate).

EXAMPLE 15

Preparation of rac. 2'-{3-[4-(o-methoxyphenyl)-1-piperazinyl]-2-acetoxy-propoxy}-acetanilide 4.35 g. of rac. 2'-{3-[4-(o-methoxyphenyl)-1-piperazinyl]-2-hydroxy-propoxy}-acetanilide are suspended in 20 ml. of pyridine and, after the addition of 2 g. of acetic anhydride, are heated under reflux conditions for 10 minutes. The reaction mixture, after being stored at room temperature for 12 hours, is poured into water. The base is exhaustively extracted with chloroform. The chloroform extract is washed with water and evaporated under reduced pressure. The residual rac. 2'-{3-[4-(o-methoxyphenyl)-1-piperazinyl]-2-acetoxy-propoxy}-acetanilide in the form of the hydrochloride, has a melting point of 201–202° C.

In an analogous manner there is obtained:

By the reaction of rac. 4'-{3-[4-(o-methoxyphenyl)-1-piperazinyl]-2 - hydroxy - propoxy}-acetanilide: rac. 4'-{3-[4-(o-methoxyphenyl) - 1 - piperazinyl]-2-acetoxy-propoxy}-acetanilide hydrochloride having a boiling point of 175° C.

EXAMPLE 16

Preparation of rac. 2'-{3-[4-(o-methoxyphenyl)-1-piperazinyl]-2-acetoxy-propoxy}-acetanilide 0.5 g. of rac. o-{3-[4-(o-methoxyphenyl)-1-piperazinyl]-2-hydroxy-propoxy}-aniline is dissolved in 5 ml. of glacial acetic acid, treated with 0.5 g. of acetic anhydride and allowed to stand at room temperature for 24 hours. The reaction mixture thereafter is poured in water and made slightly alkaline through the addition of 1N sodium hydroxide solution (pH about 9). The base is exhaustively extracted with chloroform. The chloroform extract is washed with water and evaporated under reduced pressure. The residual rac. 2'-{3-[4-(o-methoxyphenyl)-1-piperazinyl]-2-acetoxy-propoxy}-acetanilide is converted to the hydrochloride by known procedures and has a melting point of 201–202° C. (from methanol/ether).

EXAMPLE 17

Preparation of (+) o-{3-[4-(o-methoxyphenyl)-1-piperazinyl]-2-hydroxy-propoxy}-nitrobenzene dibenzoyl tartrate 38.8 g. of rac. o-{3-[4-(o-methoxyphenyl)-1-piperazinyl]-2-hydroxy-propoxy}-nitrobenzene and 36.0 g. of (+) O,O-dibenzoyl tartaric acid are dissolved in 3,500 ml. of hot methanol. The solution is allowed slowly to cool to room temperature. The (+) o-{3-[4-(o-methoxyphenyl)-1-piperazinyl]-2-hydroxy-propoxy}-nitrobenzene dibenzoyl tartrate separates out in the crystalline form. The salt of the (−) antipode remains in solution and can be recovered out of this. The salt of the (+) antipode, after recrystallization from 3,200 ml. of methanol, melts at 169° C.; $[\alpha]_D^{20} = +36.6°$ C. (in dimethylsulfoxide, C=1).

The resulting salt of the (+) antipode is added to 200 ml. of 1N sodium hydroxide solution and 500 ml. of chloroform. The mixture is agitated. The formed free base, after recrystallization from ethyl acetate/petroleum ether, has a melting point of 75–77° C.;

$[\alpha]_{436}^{20} = +14.4°$ C. [in ethanol, C=1].

3.0 g. of (+) o-{3-[4-(o-methoxyphenyl)-1-piperazinyl]-2-hydroxy-propoxy}-nitrobenzene are dissolved in 100 ml. of ethanol and hydrogenated in the presence of platinum oxide. The hydrogenation is continued until the theoretical uptake of hydrogen is completed. The catalyst is removed by filtration. The solvent is evaporated under reduced pressure. The residual (+) o-{3-[4-(o-methoxyphenyl)-1-piperazinyl]-2-hydroxy-propoxy}-aniline [the trihydrochloride of which melts at 263°; $[\alpha]_{436}^{20} = +31.8°$ C. (in water, C=1] is dissolved in 20 ml. of 3N acetic acid and treated with 1 g. of acetic anhydride. The reaction mixture is allowed to stand at room temperature for 12 hours and thereafter is evaporated under reduced pressure. The residue is dissolved in ethyl acetate and treated with ethanolic hydrochloric acid. The precipitated (+) 2'{3-[4-(o-methoxyphenyl)-1-piperazinyl]-2-hydroxy-propoxy}-acetanilide, after recrystallization from ethyl acetate, has a melting point of 179° C.; $[\alpha]_{436}^{20} = +41.1°$ C. (in water, C=1).

The (−) antipode can be obtained in a similar manner by the treatment of rac. o-{3-[4-(o-methoxyphenyl)-1-piperazinyl]-2-hydroxy-propoxy}-nitrobenzene with (−) O,O-dibenzoyltartaric acid.

EXAMPLE 18

Tablets are prepared of the following composition:

| | Mg. |
|---|---|
| (+) 2'-{3-[4-(o-methoxy-phenyl)-1-piperazinyl]-2-hydroxy-propoxy}acetanilide hydrochloride | 10 |
| Lactose | 63 |
| Corn starch | 74 |
| Talcum | 2.7 |
| Magnesium stearate | 0.3 |
| | 150.0 |

The (+) 2'-{3-[4-(o-methoxy-phenyl)-1-piperazinyl]-2-hydroxy-propoxy}-acetanilide hydrochloride is mixed with the lactose and the corn starch and granulated with the aid of ethanol. The granulate is dried, mixed with talcum and pressed to tablets.

| | Mg. |
|---|---|
| Individual weight of one tablet | 150 |
| Active substance weight of one tablet | 10 |

What is claimed is:
1. A compound of the formula

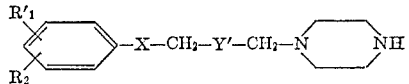

VI wherein $R'_1$ is lower alkanoylamido or N-(lower alkyl of 1 to 6 carbon atoms) lower alkanoylamido; $R_2$ is hydrogen; X is oxy and Y' is hydroxymethylene.

2. The compound in accordance with claim 1, wherein $R'_1$ is p-acetamido; $R_2$ is hydrogen; X is oxy; Y' is hydroxymethylene, i.e., 4'-[3-(1-piperazinyl)-2-hydroxy-propoxy]-acetanilide.

References Cited
UNITED STATES PATENTS

| | | | |
|---|---|---|---|
| 3,394,137 | 7/1968 | Morris | 260—268 PA |
| 3,706,755 | 12/1972 | Edenhofer | 260—268 PH |
| 3,332,997 | 7/1967 | Renner et al. | 260—268 R |
| 3,501,769 | 3/1970 | Crowther et al. | 260—268 R |
| 3,711,484 | 1/1973 | Pedrazzoli et al. | 260—268 R |
| 3,718,643 | 2/1973 | Fried et al. | 260—268 R |
| 3,723,476 | 3/1973 | Nakanishi et al. | 260—268 R |

DONALD G. DAUS, Primary Examiner